United States Patent [19]

Sakata et al.

[11] Patent Number: 5,162,960
[45] Date of Patent: Nov. 10, 1992

[54] MAGNETIC HEAD WITH IMPROVED CORE BONDING

[75] Inventors: Katsumi Sakata; Ikuko Sato; Tatsuo Kumura; Toshito Ikeda; Hiroya Eguchi; Hideaki Matsuyama; Hideaki Karamon, all of Miyagi, Japan

[73] Assignee: Sony Corporation, Tokyo, Japan

[21] Appl. No.: 613,691

[22] PCT Filed: Mar. 19, 1990

[86] PCT No.: PCT/JP90/00368
§ 371 Date: Nov. 20, 1990
§ 102(e) Date: Nov. 20, 1990

[87] PCT Pub. No.: WO90/11595
PCT Pub. Date: Oct. 4, 1990

[30] Foreign Application Priority Data

Mar. 20, 1989 [JP] Japan ................. 1-66098
Jun. 26, 1989 [JP] Japan ................. 1-160805

[51] Int. Cl.⁵ .................. G11B 5/31; G11B 5/23
[52] U.S. Cl. .................. 360/126; 360/120; 360/127; 29/603
[58] Field of Search .......... 360/120, 126, 127; 29/603

[56] References Cited

U.S. PATENT DOCUMENTS

| 3,412,455 | 11/1968 | Bronnes et al. | 228/124 |
| 4,048,714 | 9/1977 | Huntt | 360/120 |
| 4,172,318 | 10/1979 | Huntt | 360/120 |
| 4,887,177 | 12/1989 | Sillen | 360/126 |

FOREIGN PATENT DOCUMENTS

| 52-127218 | 10/1977 | Japan. |
| 59-60724 | 4/1984 | Japan. |
| 59-195315 | 11/1984 | Japan. |
| 61-137211 | 6/1986 | Japan. |
| 62-184613 | 8/1987 | Japan. |

Primary Examiner—Robert S. Tupper
Attorney, Agent, or Firm—Hill, Van Santen, Steadman & Simpson

[57] ABSTRACT

The formation of a gap in a magnetic head core or the junction of a thin magnetic film of a metal with an oxide substrate of a magnetic head made of a composite of a thin magnetic film of a metal with an oxide material are conducted by the thermal diffusion between gold layers themselves at a low temperature. Then, chromium or titanium is provided between the gold layer and the junction surface to prevent deterioration of magnetic characteristics and generation of a false gap and, at the same time, to heighten the junction strength. The thermal diffusion between the gold layers themselves is effected at a temperature lower than that of glass fusion to suppress the deterioration of magnetic characteristics, distortion caused by thermal expansion, and diffusion reaction on the interface. The chromium or titanium layer works to maintain function strength between the thin magnetic layer or the oxide substrate and the gold layer.

2 Claims, 6 Drawing Sheets

MAGNETIC HEAD WITH IMPROVED CORE BONDING

BACKGROUND OF THE INVENTION

The present invention relates to a magnetic head which is mounted on a magnetic recording/playback device such as a video tape recorder, a floppy disc drive device, or a hard disc drive device, etc.

In a so-called composite type magnetic head in which an oxide material such as Mn-Zn ferrite or ceramics and a magnetic thin metal film are made in composite fashion, a junction or bonding of the oxide material with the magnetic thin metal film may be required in the manufacturing process thereof. For example, in a magnetic head in which the magnetic thin metal film is made composite in a direction perpendicular to a gap portion, it is necessary to bond another oxide substrate to an oxide substrate on which a magnetic thin metal film is formed so that both the substrates sandwich the magnetic thin metal film therebetween. Alternatively, an oxide substrate is bonded to both sides of a magnetic thin metal film which is made into a thin strip.

Fusion glass having a high melting point is used for carrying out the above mentioned bonding of an oxide substrate and a magnetic thin metal film, unless a problem occurs. This is because the high melting point glass has advantages that such glass can be washed with organic solvent since it is chemically stable and strong bonding can be obtained.

However, it is necessary to elevate the fusing temperature not less than 550° C. for carrying out bonding with glass having a high melting point. Accordingly, distortion due to thermal expansion may be caused in ferrite or magnetic thin metal film and the influence by the distortion may induce cracking in a magnetic core, resulting in deterioration of magnetic characteristics.

When the magnetic thin metal film is formed of a ferromagnetic amorphous metallic alloy, a so-called amorphous alloy, the fusing temperature is generally not less than the crystallization temperature (crystallization temperature is generally 400° C. to 500° C.). Accordingly, crystallization of the amorphous alloy deteriorates soft magnetic characteristics. If the oxide substrate is bonded to the magnetic thin metal film with a high melting point glass, the glass and the magnetic thin metal film, or the oxide substrate and the magnetic thin metal film, effect an oxidation-reduction reaction at the interface therebetween so that a region at which the permeability is remarkably lowered results, that is, a reaction layer may be formed.

If the above mentioned problems occur, a low temperature bonding agent such as a fusing glass having a low melting point, water glass or organic adhesive agent is used to bond the oxide substrate to the magnetic thin metal film. However, if the above mentioned low temperature bonding agent is used for bonding the oxide magnetic material to the magnetic thin metal film, the low temperature bonding agent has a disadvantage that it is inferior to the high melting point glass in bonding strength, weather resistance, wear resistance, surface characteristics and precision of thickness of the bonding layer.

On the other hand, it is said that bonding with high melting point glass which is chemically stable and high in bonding strength as is similar to bonding between the oxide substrate and the magnetic thin metal film in the above mentioned composite type magnetic head is preferable to bond the magnetic cores themselves at a gap therebetween in a magnetic head formed of oxide magnetic material such as Mn-Zn ferrite or a magnetic head in which the oxide magnetic material and the magnetic thin metal film are made composite. Particularly, this tendency is strong in a magnetic head which is mounted on a magnetic recording/playback device such as a video tape recorder since such a magnetic head requires durability.

However, if magnetic cores in which the oxide magnetic material such as ferrite is made composite, the magnetic thin metal films are bonded with each other with glass, and a reaction layer may be formed. If the interface between the ferrite and the magnetic thin metal film is formed in parallel with a magnetic gap, the reaction layer acts as a false gap, resulting in waves in frequency characteristics of the playback output.

If glass having a melting temperature not higher than 500° C. is used in order to avoid the false gap, reliability is low in humidity resistance and hardness. Low melting point glass having a low reliability should be used as a secondary fusion glass, particularly for a composite type magnetic head (in which integrated magnetic cores are embedded in a non-magnetic member, a so-called slider by glass fusing) which is mounted on a floppy disc drive device or a hard disc drive device, which requires glass bonding several times. That is, such a type of magnetic head is produced by first conducting a gap bonding (first fusing) with high melting point glass and thereafter by fusing (second fusing) the bonded and integrated magnetic cores to the slider with a low melting point glass to be embedded for fixing the cores on the slider. Accordingly, if the first fusing glass is melted out on the second fusing so that the gap length of track width, etc. changes, the reliability of the magnetic head would be largely lowered. Therefore, only low melting point glass can be used as the second fusing glass.

In such a manner, it is difficult for a gap bonding method using fusing glass to achieve, while keeping the magnetic characteristics inherent to the magnetic core, a prevention of false gap formation and bonding strength of the magnetic head which requires bonding of two or more films of glass.

A magnetic head in which Au is mainly used as the material in lieu of fusing glass, and wherein Au films are bonded with each other by thermal diffusion at a low temperature for gap bonding, is disclosed by IEEE TRANSACTIONS ON MAGNETICS, Vol. 24, No. 2, Mar. 1, 1988. The magnetic head is produced by successively laminating $SiO_2$, Mo and Au on the abutting faces of a pair of magnetic cores to a given film thickness and abutting to bond Au film to themselves by thermal diffusion.

Since thermal diffusion with Au is conducted at a temperature very much lower than a fusing temperature for glass bonding, it is said that there is no influence by distortion due to thermal expansion, and a false gap will never be formed, and deterioration of head characteristics caused by crystallization can be prevented.

Although the method of bonding a gap which mainly uses Au as a gap material to bond the Au layers themselves by thermal diffusion at a low temperature can solve the prior art problem to some extent by using fusing glass, the bonding strength between an Au layer and the oxide material or an Au layer and the magnetic thin metal film is insufficient, so that it is not enough for a magnetic head mounted on a magnetic recording/- playback device such as a video tape recorder which requires a high durability for the magnetic head.

If glass fusing using high melting point glass is adopted for bonding between a magnetic thin metal film and an oxide substrate or magnetic cores themselves at a gap therebetween in a composite type magnetic head as mentioned above, problems such as deterioration of the magnetic characteristics of magnetic thin metal film and the false gap generation due to formation of a reaction layer would occur. On the other hand, it is difficult to assure sufficient bonding strength by bonding using low melting point glass or an organic adhesive agent and the like, and a problem remains in reliability. Although a method of gap bonding by thermal diffusion of Au layers has been proposed, the bonding strength is not sufficient.

In such a manner, it is a fact that it is difficult in the prior art to assure both magnetic characteristics and bonding strength.

Accordingly, the present invention was proposed in view of these prior art circumstances.

SUMMARY OF THE INVENTION

It is an object of the present invention to provide a magnetic head which can prevent deterioration of magnetic characteristics and generation of a false gap, and which has excellent reliability in bonding strength.

The present invention is proposed to accomplish the above mentioned object and provides a magnetic head including a pair of magnetic cores which are bonded with each other via a gap material. At least one of the magnetic cores comprises a magnetic thin metal film and an oxide substrate. At least a first metal layer formed of chromium or titanium and a second metal layer formed of gold are laminated on each of the bonding faces of the magnetic thin metal film and the oxide substrate. The magnetic thin metal layer and the oxide substrate are made in composition and integral by thermal diffusion between the second metal layers themselves.

The present invention further provides a magnetic head including a pair of magnetic cores which are bonded with each other via a gap material. At least a first metal layer formed of chromium or titanium and a second metal layer formed of gold are laminated on the bonding face of each of the magnetic cores and the magnetic cores are bonded with each other by thermal diffusion between the second metal layers themselves.

Thermal diffusion bonding with Au is conducted at a very low temperature from 150° C. to 300° C. The difference between the temperature of thermal diffusion bonding and the fusing temperature 550° C. of this bonding is 250° C. to 400° C. Accordingly, deterioration of magnetic characteristics, influence of distortion due to thermal expansion, and an oxidation-reduction reaction at the interface is suppressed.

This is advantageous particularly if an amorphous alloy is used for the magnetic thin metal film. Deterioration of soft magnetic characteristics due to crystallization is prevented since the thermal diffusion temperature becomes equal to or more than the crystallization temperature (400° C. to 500° C.).

Accordingly, in the magnetic head of the present invention, a problem of a false gap is eliminated and the electro-magnetic conversion characteristics is improved and excellent playback output characteristics are exhibited.

Particularly, in a magnetic head which requires glass bonding two or more times, it is possible to use fusing glass having a high reliability for secondary fusing glass so that more enhancement in bonding strength can be achieved, and it is advantageous in reliability.

On the other hand, since a first metallic layer comprising Cr or Ti is provided as an underlayer of a second metal layer comprising Au, high bonding strength is assured. Since the present magnetic head is excellent in weather resistance and wear resistance, enhancement in durability and reliability can be achieved and the present invention is advantageously applicable to a magnetic head used for a video tape recorder and the like in which high durability of a magnetic head is required.

Furthermore, since the magnetic head of the present invention is excellent in surface characteristics for a magnetic recording medium sliding face, problems of clogging and seizing during running of the tape can be solved.

BRIEF DESCRIPTION OF THE DRAWINGS

FIGS. 1(a) through 1(c) show an embodiment of a magnetic head to which the present invention is applied wherein FIG. 1(a) is a schematic perspective view, FIG. 1(b) is a main part enlarged sectional view showing the lamination of metallic layers prior to bonding, and FIG. 1(c) is a main part enlarged sectional view showing bonding materials is a large scale;

FIG. 3(a) is a perspective view showing a first block, FIG. 3(b) is a perspective view showing a second block, FIG. 3(c) is a perspective view showing an example of a bonding jig for applying a pressure upon a bonding interface between the first and second blocks, FIG. 3(d) is a perspective view showing a head chip which is thermal diffusion bonded at a low temperature, and FIG. 3(e) is a perspective view showing a way in which the head chip is supported on a traverse test jig.

DESCRIPTION OF THE PREFERRED EMBODIMENTS

Embodiments of the present invention will now be described in detail with reference to the drawings.

FIRST EMBODIMENT

Figure 1A:
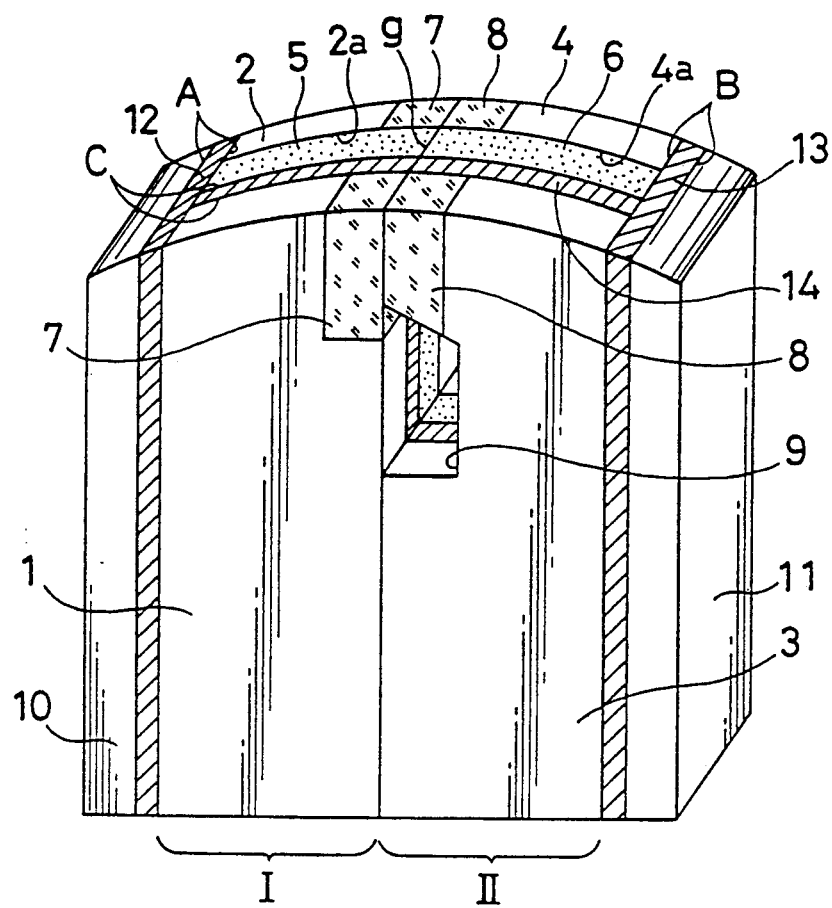
Figure 1:
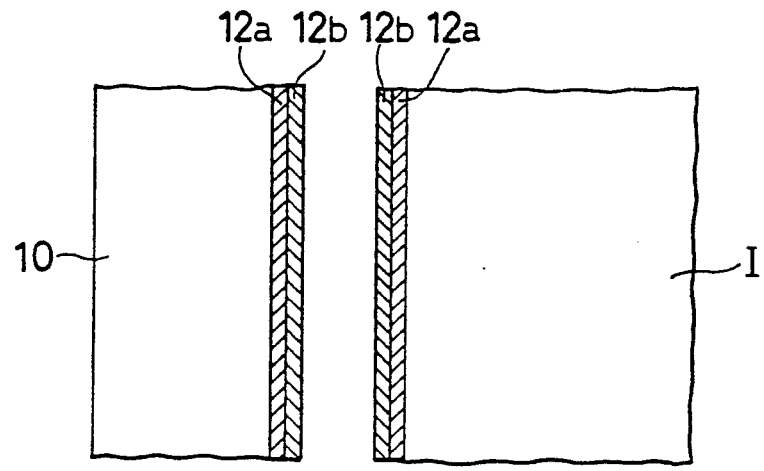
Figure 1:
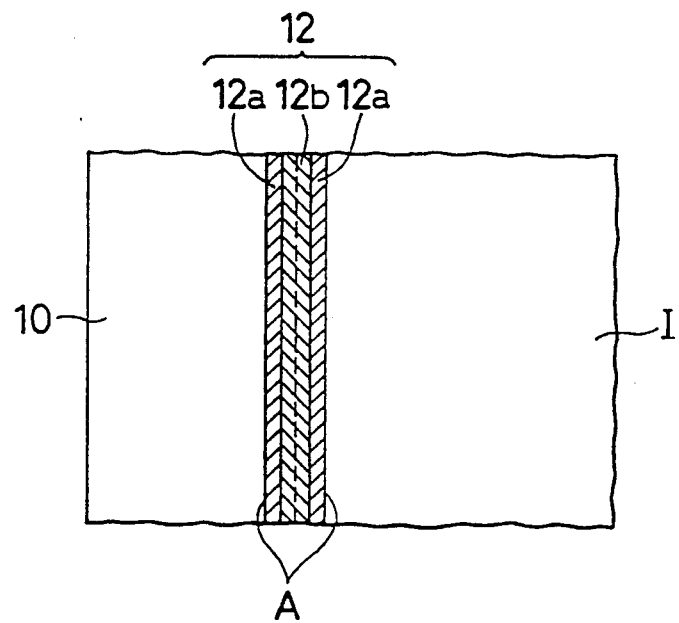

The magnetic head in the present embodiment shown in FIG. 1 is a so-called laminated type magnetic head comprising a pair of magnetic cores (I) and (II) which are bonded with each other. Each magnetic core comprises substrates 1 and 2 or 3 and 4 formed of an oxide material such as ferrite, ceramics and the like, which sandwich a thin metallic magnetic film 5 or 6 formed of an amorphous alloy and the like. A magnetic gap g is formed between abutting surfaces of the metallic thin magnetic films 5 and 6 to establish a closed magnetic path.

The substrates 1, 2, 3 and 4 are notched in the vicinity of the magnetic gap. The notched portions are filled with glass materials 7 and 8. Accordingly, the magnetic gap g is formed at the end face of thin metal films 5 and 6. The film thickness of the thin metal magnetic films 5 and 6 corresponds to a track width. The magnetic core (II) comprising substrates 3 and 4 and the thin metal magnetic film 6 is formed with a wire groove 9 for winding a wire coil on the core. Via the coil (not shown), signals are supplied to the magnetic head or the signals picked up by the magnetic head are detected. The wire groove may be formed on at least one side of the magnetic core I comprising the substrates 1 and 2 and the metallic thin magnetic film 5 and the magnetic core II.

Other than the above mentioned amorphous alloy, the metallic thin magnetic films 5 and 6 may include any of the alloys as follows: For example, Fe-Al-Si based alloys, Fe-Al based alloys, Fe-Si-Co based alloys, Fe-Ni based alloys, Fe-A -Ge based alloys, Fe-Ga-Ge based alloys, Fe-Si-Ge based alloys, Fe-Co-Si-Al based alloys, Fe-Ca-Si based alloys are applicable. Furthermore, at least one of Ti, Cr, Mn, Zr, Nb, Mo, Ta, W, Ru, Os, Rh, Ir, Re, Ni, Pb, Pt, Hf, V and the like may be added thereto for further enhancing erosion resistance, wear resistance and the like.

The magnetic thin metal films 5 and 6 are first formed on the surfaces 2a, 4a of the substrates 2 and 4 by vacuum thin film forming technology, such as sputtering, vacuum evaporation, ion plating, or cluster ion beam methods. The magnetic thin metal films 5 and 6 are then bonded to the substrates 1 and 3 on the side opposite to the side bonded to the substrates 1 and 3 for forming a laminated structure. A bonding material is formed in a bonding interface C.

The magnetic cores I and II are formed with subsidiary members 10 and 11, respectively at the both ends thereof for reinforcing the bonding between the magnetic cores I and II. It will suffice that the width and height of the subsidiary members 10 and 11 be equal in size to the width and height of the end faces of the magnetic cores I and II, and that the material used for the members 10 and 11 is the same as that of the substrates 1, 2, 3 and 4. A bonding material 13 is formed at a bonding interface B between the magnetic core II and the subsidiary number 11.

The present inventors have in practice formed the bonding members 12, 13 and 14 under the conditions mentioned below and have produced a magnetic head having a structure shown in FIG. 1(a). At the bonding interfaces A, B and C, the bonding members 12, 13 and 14 are all formed in a similar manner. Only a method of forming the bonding member 12 will be described herein.

The bonding member 12 comprises a first metal layer 12a made of Cr or Ti and a second metal layer 12b made of Au. That is, the first metal layer 12a and second metal layer 12b are successively laminated by sputtering or vacuum evaporation on the magnetic core I and the subsidiary member 10 to form a double-layered structure as shown in FIG. 1(b). The film thickness of the first and second metal layers 12a and 12b is appropriately selected and usually falls within a range of several hundreds to several thousands Å. In the present embodiment, an excellent result was obtained when it was 1200 Å. The magnetic core I and the subsidiary member 10 are bonded with each other by abutting two second metal layers 12b with each other for thermal diffusion as shown in FIG. 1(c). Bonding of these second metal layers 12b by thermal diffusion is carried out by abutting the magnetic core I on the subsidiary member 10 at the second metal layers 12b and heat-treating them under a pressure not less than 10 MPa at a temperature of about 300° C. If the heat-treating atmosphere is at a vacuum of about $10^{-5}$ Torr at this time, higher bonding strength would be obtained.

The bonding of these second metal layers 12b by thermal diffusion is possible at a temperature lower than the fusing temperature of high melting point glass by 250° C. to 400° C. Therefore, the magnetic core I is not influenced by distortion due to thermal expansion of heating at high temperatures. There is no possibility that a reaction layer is formed at an interface between the substrates 1, 2 and the magnetic thin metal film 5. Furthermore, even if the magnetic thin metal film 5 is an amorphous alloy, the magnetic characteristics will not deteriorate since the thermal diffusion temperature is not higher than a crystallization temperature.

Although the second metal layers 12b are bonded at a low temperature, the bonding strength of the layers is so high that they can endure against the working of the magnetic head.

Accordingly, the magnetic head of the present embodiment has a magnetic characteristic inherent to the magnetic head which will not deteriorate and is excellent in electro-magnetic conversion characteristics. Therefore, enhancement in playback output characteristics can be expected. Furthermore, a high reliability can be assured in bonding strength.

Furthermore, the thermal diffusion bonding of the second metal layers 12b has a high reliability with respect to weather resistance, wear resistance, surface characteristics and precision of thickness of the bonding layer. Since the surface characteristics of a magnetic recording medium sliding surface is excellent if the bonding faces A, B and C are bonded by thermal diffusion of Au, problems of clogging and seizing during tape running would not occur.

Bonding of Au layers by thermal diffusion is applicable to the bonding of magnetic cores with each other at the gap. Also in the present embodiment, gap bonding was carried out by forming a four-layered structure having a lamination of the first metal layer and the second metal layer and bonding them with each other by thermal diffusion of Au, as is similar to the above mentioned bonding of the magnetic core I and the subsidiary member 10, and an excellent result was obtained. That is, application of thermal diffusion of Au to the gap bonding eliminates glass fusion and thus deterioration of the magnetic characteristics caused by heat.

SECOND EMBODIMENT

Figure 2:
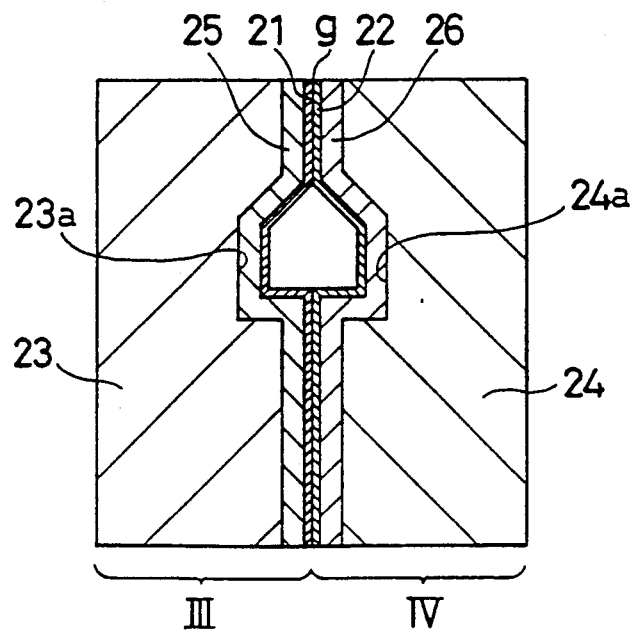
FIG. 2(a) is a sectional view showing another embodiment of a magnetic head to which the present invention is applied.
FIG. 2(b) is a main part enlarged sectional view showing a magnetic gap in a large scale.
Figure 2:
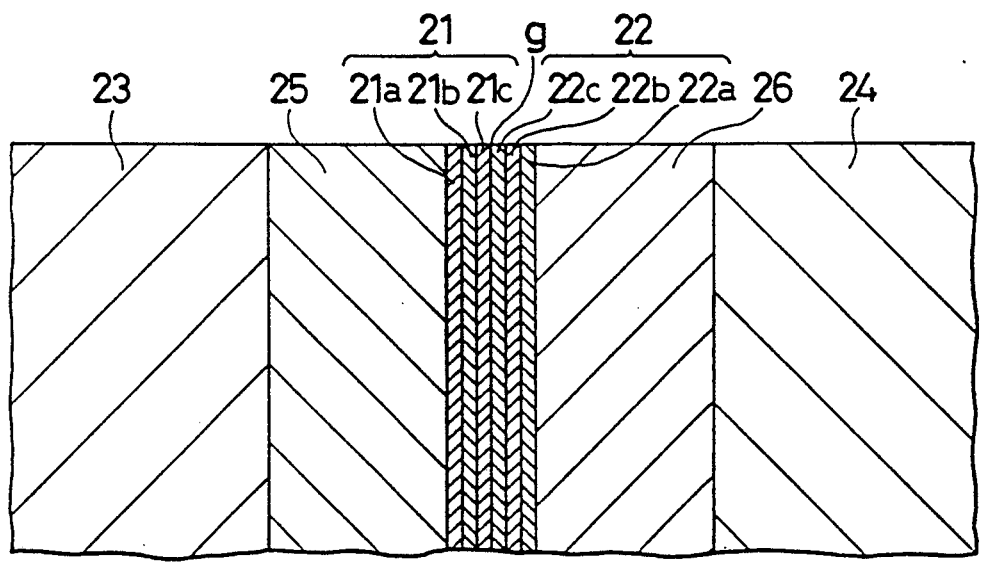

In a magnetic head of the present embodiment, a pair of magnetic cores III and IV, each comprising a substrate 23 or 24 made of an oxide magnetic material such as ferrite to which a metallic magnetic thin layer 25 or 26 made of an amorphous alloy and the like, is deposited as shown in FIGS. 2(a) and 2(b). A magnetic gap g is formed between the abutting face of the magnetic cores III and IV to form a closed magnetic path.

The substrates 23 and 24 are formed with wire grooves 23a and 24a, respectively for winding coils around the cores.

Other than the above mentioned amorphous alloys, the metal thin magnetic films 25 and 26 may include any of the alloys as follows: For example, Fe-Al-Si based alloys, Fe-Al based alloys, Fe-Si-Co based alloys, Fe-Ni based alloys, Fe-Al-Ge based alloys, Fe-Ga-Ge based alloys, Fe-Si-Go based alloy, Fe-Co-Si-Al based alloys, Fe-Ga-Si based alloys are applicable. Furthermore, at least one of Ti, Cr, Mn, Zr, Nb, Mo, Ta, W, Ru, Os, Rh, Ir, Re, Ni, Pb, Pt, Hf, V and the like may be added thereto for further enhancing erosion resistance, wear resistance and the like.

The magnetic thin metal films 25 and 26 are first formed on the substrates 23 and 24 by vacuum thin film forming technology, such as sputtering, vacuum evaporation, ion plating, or cluster ion beam methods.

Gap materials 21 and 22 are formed on the bonding faces of the magnetic cores III and IV, respectively to which magnetic thin metal films 25 and 26 are deposited. The gap materials 21 and 22 comprise $SiO_2$ layers 21a, 22a, first metal layers 21b, 22b made of Cr or Ti, and second metal layers 21c and 22c made of Au, respectively. That is, $SiO_2$ layers 21a, 22a, first metal layers 21b, 22b and second metal layers 21c, 22c are successively laminated on the magnetic thin metal layers 25 and 26 by sputtering or vacuum evaporation to form a three-layered structure.

Total film thickness of these gap materials 21 and 22 corresponds to the magnetic gap length g of the magnetic head. The film thickness of the first metal layers 21b and 22b is preferably on the order of 100 to 600 Å, and the film thickness of the second metal layers 21c and 22c is preferably on the order of 200 to 600 Å.

The $SiO_2$ layers 21a and 22a may be omitted if the properties of bonding of the $SiO_2$ to the magnetic thin metal films 25 and 26 are adverse. Additional metal layers made of Cr and Ti may be interposed between the magnetic thin metal films 25, 26 and the $SiO_2$ layers 21a, 22a for forming a four-layered structure without omitting the $SiO_2$ layers 21a, 22a.

The thus formed magnetic cores III and IV are bonded with each other by abutting two second metal layers 21c, 22c with each other and thermally diffusing them. Bonding of these second metallic layers 21c and 22c by thermal diffusion is carried out by abutting the magnetic cores II and III with each other at the second metal layers 21c, 22c, and heat-treating them under a pressure not less than 10 MPa at a temperature of about 150° to 300° C. If the heat-treating atmosphere is at a vacuum of about $10^{-5}$ Torr at this time, a more firm bonding strength would be obtained. Since the bonding of these second metal layers 21c and 22c by thermal diffusion is carried out at a very low temperature of 150° to 300° C. as mentioned above, the temperature is lower than the fusing temperature at which a fusing glass is used by 250° C. to 400° C. Therefore, the substrates 23, 24 and the magnetic thin metal films 25 and 26 are not influenced by distortion due to thermal expansion by heating at a high temperature. There is no possibility that a reaction layer is formed at an interface between the substrates 23, 24 and the metallic magnetic thin films 25, 26 so that it is not necessary to pay attention to generation of a false gap, even if the interface is located in parallel with the magnetic gap g.

The bonding strength of the second metal layers 21c and 22c is several times as high as that when a fusing glass is used. They will never open even when the layers are heated again after bonding by thermal diffusion. Accordingly, annealing treatment of the head chip is possible at a high temperature after working on the head chip so that working stress can be eliminated.

Accordingly, in accordance with the magnetic head of the present embodiment, the magnetic characteristics inherent to the magnetic core will not be lost and a false gap will not be generated. Accordingly, the electromagnetic conversion characteristics are excellent and further enhancement of playback output characteristics can be expected. Of course, the bonding strength between the magnetic cores is sufficiently high and the reliability is enhanced. If the magnetic head of the present embodiment is applied to a composite type magnetic head which is mounted on a floppy disc drive device or a hard disc drive device and the like, a high melting point glass having a high reliability can be used as a secondary fusing glass used for the fixing with a slider.

Although the present embodiment has been described with reference to a metal-in-gap type magnetic head, the description of a single ferrite head is, of course, the same as above.

The above mentioned ferrite head is fabricated as follows:

First, substrates 23 and 24 made of ferrite are provided and are formed with winding wire grooves 23a and 24a having a desired shape by cutting working.

An amorphous alloy is then sputtered to a desired film thickness on the surface which will be abutting faces of the substrates 23 and 24 including the winding wire grooves 23a and 24a for forming magnetic thin metal films 25 and 26.

$SiO_2$, Cr or Ti, and Au are then successively sputtered on the magnetic thin metal films 25 and 26 to a desired film thickness for forming gap materials having a three-layer structure, each comprising an $SiO_2$ layer 21a, 22a, a first metal layer 21b, 22b of Cr or Ti, and a second metal layer 21c, 22c of Au.

The magnetic cores III and IV are then abutted with each other so that the second metal layers 21c and 22c are bonded with each other and a pressure not less than 10 MPa is applied to the bonding faces between two layers 21c and 22c by using a jig or the like.

The cores are heat-treated in a heat-treating atmosphere of $10^{-5}$ Torr at a temperature of 150° C. to 300° C. for a given period of time.

Thus, thermal diffusion of Au between the cores performs a bonding. As a result, the magnetic cores III and IV are firmly bonded with each other. Since the thermal diffusion is conducted at a low temperature, characteristics inherent to the magnetic cores III and IV will never deteriorate.

Finally, a magnetic head is completed by cutting the bonded cores into a head chip having a desired dimension.

A detailed embodiment of the present invention has been described. The inventors have studied what bonding strength is obtained if the gap material which has been used in the above embodiment is used. On measuring the bonding strength, Mo is also used in addition to Cr, Ti which are an under coat material of the Au layer interposed between the $SiO_2$ layer and the Au layer, which is the second layer.

Figure 3:
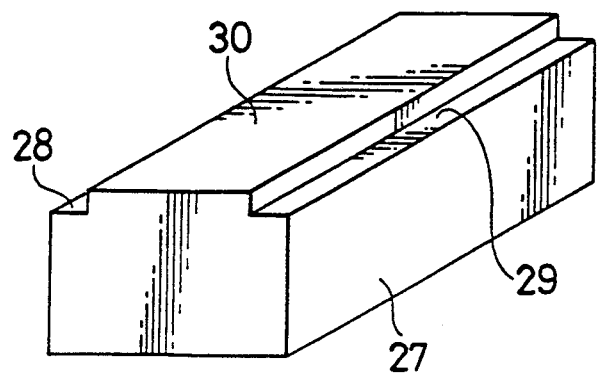
FIGS. 3(a) through 3(e) show a process for measuring a traverse force of a head chip, and in the order of steps
Figure 3:
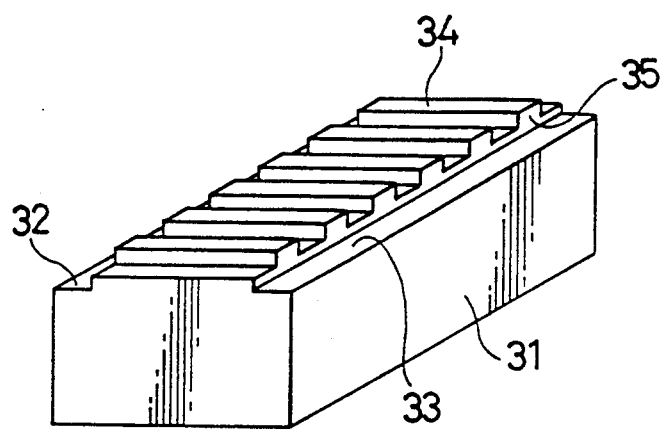
Figure 3:
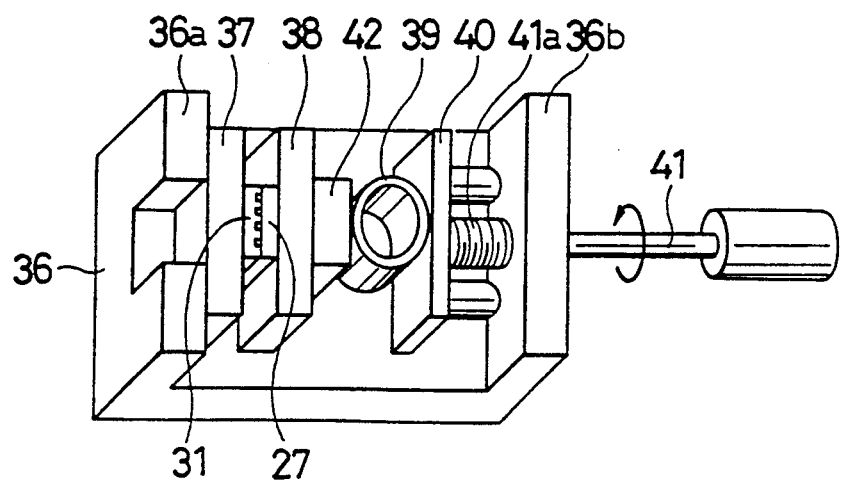
Figure 3:
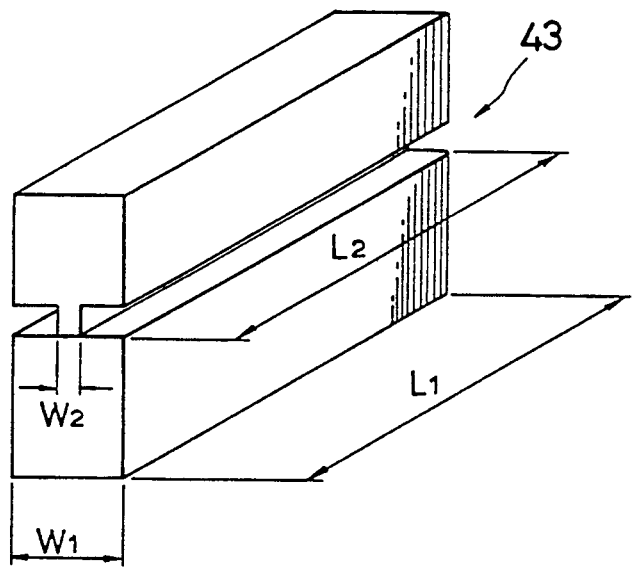
Figure 3:
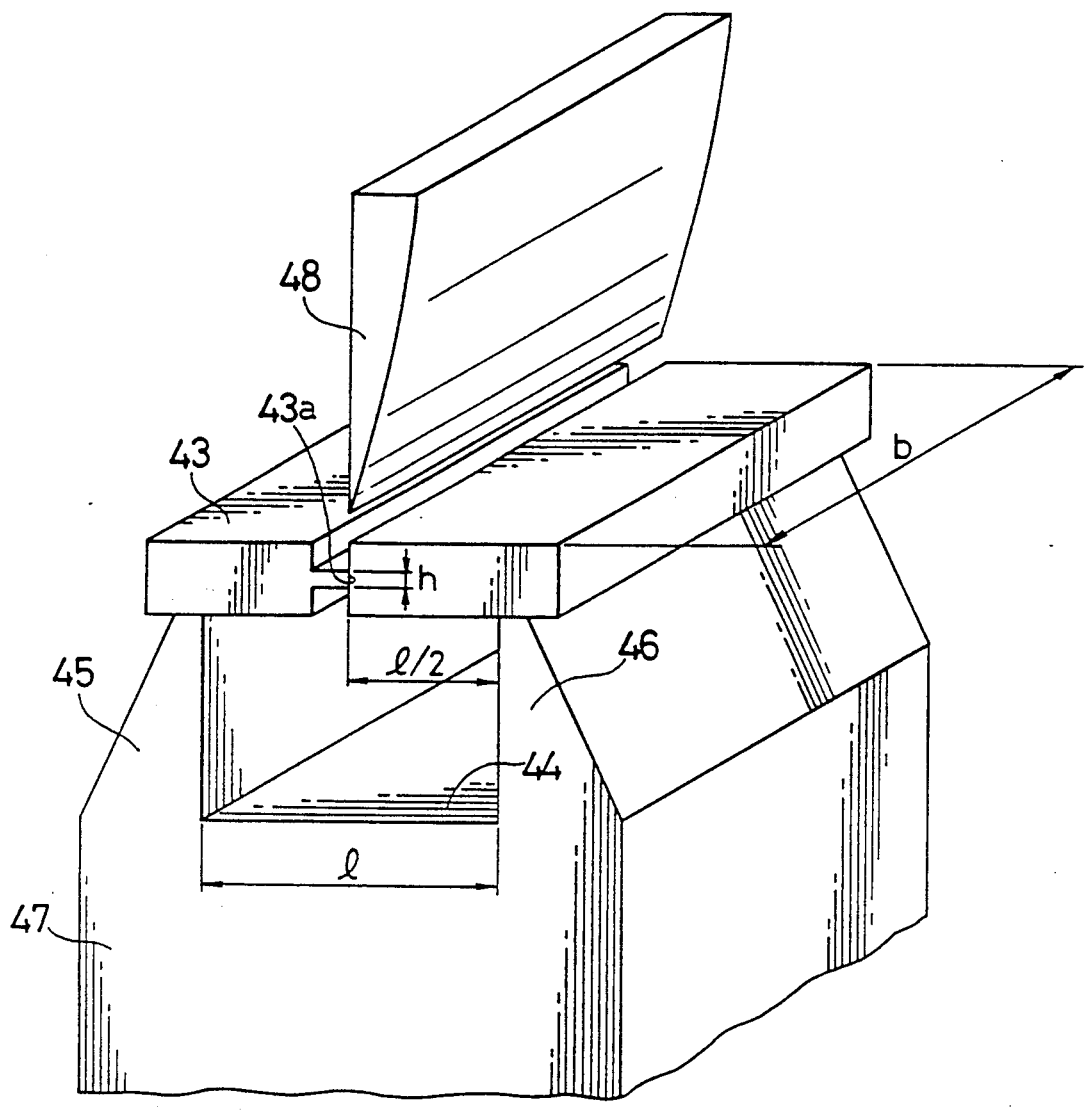

Measurement of bonding strength was conducted as follows:

A first block 27 of ferrite was first provided and is formed with cut grooves 28 and 29 at both ends thereof along the length thereof as shown in FIG. 3(a). Thereafter, a main face of the first block 27 was mirror-finished to form a bonding face 30.

The first block 27 was 13,045 μm in length, 2573 μm in width and 1000 μm in height, and the bonding face was 2435 μm in width.

A second block 31 of ferrite was similarly formed with cut grooves 32 and 33 at both ends thereof along the length thereof as shown in FIG. 3(b) and thereafter the main face.

Then cutting working is applied to the main face in a direction normal to the cut grooves 32 and 33 to form convex portions 33, each having a bonding face 34 to which gap material is adhered.

The second block 31 was 13,045 μm in length, 2573 μm in width and 1000 μm in height, and the cut grooves 32 and 33 were 150 μm in depth and convex portions 35 were 2264 μm in longitudinal length, 26 mm in width along the short side thereof, and 100 μm in height. 23 convex portions 35 were formed.

Gap material was sputtered on the bonding faces 30 and 34 of the first and second blocks 27 and 31, respectively.

A gap material in which $SiO_2$ of 600 Å, Mo of 300 Å, and Au of 600 Å were successively laminated was used in Test 1. A gap material in which $SiO_2$ of 600 Å, Cr of 300 Å, and Au of 600 Å were successively laminated was used in Test 2, and a gap material in which $SiO_2$ of 600 Å, Ti of 300 Å, and Au of 600 Å were successively laminated was used in Test 3.

Sputtering was conducted in an Ar atmosphere of $4.0 \times 10^{-2}$ Torr for sputtering $SiO_2$, Mo, Cr, and Ti. Output was 300 W. the output for sputtering Au was 100 W. The first and second blocks 27 and 31 were not heated.

The first and second blocks 27 and 31 were abutted with each other so that the Au layers were bonded with each other. A desired pressure was applied to the bonding faces by using a bonding jig as shown in FIG. 3(c). In the present experiment, the bonding pressure was 80 MPa.

The bonding jig comprises a base platform 36, a pair of flat blocks 37 and 38 which sandwich the first and second blocks 27 and 31 therebetween, a ring spring 39, a plate 40 for pressing the ring spring 39, and a screw 41a for moving the plate 40 forward and rearward. The screw 41a is provided with a torque driver 41 for rotating the screw 41a. All members for forming the jig are formed of $AlO_2$, except the ring spring 39.

The base platform 36 has convex portions 36a and 36b extending in a longitudinal direction at both ends thereof. The convex portion 36a serves to fix the flat block 37. The other convex portion 36b serves to mount the screw 41a. The other convex portion 36b is provided with a thread which is threadably engaged with the screw 41a. The pair of flat blocks 37 and 38, the ring spring 39, the plate 40, and the screw 41a are disposed between the convex portions 36a and 36b. In other words, one flat block 37 is provided in contact with one convex portion 36a, and the other flat block 38 is provided opposing thereto. The ring spring 39 is disposed via the spacer 42 between the other flat block 38 and the plate 40, and the screw 41a is abutted upon the plate 40.

In order to apply a desired pressure upon the bonding face between the first and second blocks 27 and 3 by using the bonding jig, the first and second blocks 27 and 31 are disposed between a pair of flat blocks 37 and 38. The screw 41a is rotated in a direction of an arrow shown in FIG. 3(c) by means of a torque driver 41 so that a pressure of 80 MPa is applied to the bonding face between the first and second blocks 27 and 31. The screw is then forced forward to bias the plate 40, and the plate 40 in turn biases the ring spring 39. The other flat block 38 is biased via the spacer 42 by a spring force of the ring spring 39. As a result of this, a desired pressure is applied upon the bonding face between the first and second blocks 27 and 31.

The first and second blocks 27 and 31 were heat-treated while a desired pressure was applied to the bonding face between the first and second blocks 27 and 31 as is similar to the previous step.

The heat-treatment was conducted in a vacuum furnace at $10^{-5}$ Torr. The temperature was elevated from 20° C. to 300° C. for one hour, and was kept at 300° C. for one hour and was lowered from 300° C. to 50° C. for one hour.

The first and second blocks 27 and 31 which have been thermal diffusion bonded was cut into a head chip 43 as shown in FIG. 3(d).

In the present experiment, the head chip 43 was 240 μm in width $W_1$, 1900 μm in length $L_1$, and the bonding portion was 26 mm in width $W_2$ and 1746 μm in length $L_2$. The bonding area of the head chip 43 was 45396 μm².

The head chip 43 was supported on the traverse test jig 47 which is formed with the convex supporting portions 45 and 46 at a given interval at both ends thereof and has a concave groove 44 as shown in FIG. 3(e).

That is, the head chip 43 was supported on two points so that the bonding face 43a is located at a position 1/2 away from the supporting portions 45 and 46 which are separated at a distance l (corresponding to the width of the recess groove 44).

A knife 48 mounted on a push-pull gauge above the bonding face 43a of the head chip 43 was descended at a constant speed to bend the head chip 43. A load P when the head chip 43 was bent was read. A traverse test was conducted ten times. The results are sown in the Table hereafter.

| TRAVERSE | TRAVERSE LOAD P(g) | | |
|----------|--------|--------|--------|
| TIMES | TEST 1 | TEST 2 | TEST 3 |
| 1 | 9 | 21 | 25 |
| 2 | 4 | 28 | 14 |
| 3 | 6 | 25 | 14 |
| 4 | 5 | 24 | 24 |
| 5 | 5 | 16 | 13 |
| 6 | 13 | 9 | 34 |
| 7 | 7 | 18 | 8 |
| 8 | 8 | 26 | 22 |
| 9 | 9 | 29 | 8 |
| 10 | 7 | 22 | 7 |
| AVERAGE | 7.3 | 21.3 | 16.9 |

From the thus measured traverse load P, a traverse force of each head chip 43 was determined. The traverse force is determined by the following formula (1).

$$\text{Traverse force } \sigma\text{max} = \frac{3Pl}{2bh^2} \quad (1)$$

wherein P represents a traverse load (Kg), l represents a distance between the supporting portions (mm), h a width of the bonding portion of the head chip (mm), and b a length of the bonding portion of the head chip (mm). In the present test, l=1 mm, h=0.026 mm, and b=1.746 mm.

$$\text{Test 1: } \sigma\text{max}_1 = \frac{3 \times 7.3 \times 10^{-3} \times 1}{2 \times 1.746 \times 0.026^2}$$

$$= 9.28 \text{ kg/mm}^2$$

$$\text{Test 2:} \quad \sigma\text{max}_2 = \frac{3 \times 21.3 \times 10^{-3} \times 1}{2 \times 1.746 \times 0.026^2}$$
$$= 27.07 \text{ kg/mm}^2$$

$$\text{Test 3:} \quad \sigma\text{max}_3 = \frac{3 \times 16.9 \times 10^{-3} \times 1}{2 \times 1.746 \times 0.026^2}$$
$$= 21.48 \text{ kg/mm}^2$$

The traverse force was 5.4 kg/mm$^2$ when a similar test was conducted by using fusing glass.

It is understood from the above results that the head chip in Tests 2 and 3 has a strength about 2 to 3 times as strong as that in Test 1. Accordingly, if Cr and Ti are used for underlayer of the Au layer, a highly reliable magnetic head having a bonding strength far higher than the magnetic head using Mo underlayer or fusing glass could be obtained.

Although various minor changes and modifications might be proposed by those skilled in the art, it will be understood that we wish to include within the claims of the patent warranted hereon all such changes and modifications as reasonably come within our contribution to the art.

We claim:

1. A magnetic head, comprising:
first and second magnetic cores;
a magnetic gap between the magnetic cores;
first and second subsidiary members positioned at respective outwardly facing side surfaces of each of the magnetic cores opposite the magnetic gap;
respective first and second bonding interfaces between the respective first subsidiary member and first magnetic core and respective second subsidiary member and second magnetic core;
each of said first and second bonding interfaces consisting of a first metal layer directly abutting a side surface of the respective subsidiary member, a second metal layer directly abutting the first metal layer, a further second metal layer, a thermal diffusion between the two second metal layers, and a further first metal layer directly between the further second metal layer and the respective magnetic core where it directly abuts at said outwardly facing side surface thereof; and
both of the first metal layers comprising one of the elements selected from the group Cr or Ti and both of the second metal layers comprising Au.

2. A magnetic head, comprising:
first and second magnetic cores each having a thin metallic magnetic film at a tape facing surface of the magnetic core;
a magnetic gap between the magnetic cores;
a bonding interface between a side of each of the magnetic films and a portion of each of the cores, said bonding interface having a longitudinal extent perpendicular to said gap;
said bonding interfaces consisting of a first metal layer directly abutting said side of each of the magnetic films, a second metal layer directly abutting the first metal layer, a further second metal layer, a thermal diffusion between the two second metal layers, and a further first metal layer directly between the further second metal layer and said portions of each of the cores where it directly abuts; and
both of the first metal layers comprising one of the elements selected from the group Cr or Ti and both of the second metal layers comprising Au.

* * * * *